United States Patent
Onaka et al.

(10) Patent No.: US 8,139,285 B2
(45) Date of Patent: Mar. 20, 2012

(54) RAMAN AMPLIFYING DEVICE AND CONTROL METHOD

(75) Inventors: Miki Onaka, Kawasaki (JP); Kiyotoshi Noheji, Kawasaki (JP); Togo Fukushi, Kawasaki (JP); Masanori Kondoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 12/360,906

(22) Filed: Jan. 28, 2009

(65) Prior Publication Data

US 2009/0190206 A1 Jul. 30, 2009

(30) Foreign Application Priority Data

Jan. 28, 2008 (JP) ................. 2008-016430

(51) Int. Cl.
*H04B 10/17* (2006.01)
*H01S 3/30* (2006.01)
*H04B 10/12* (2006.01)

(52) U.S. Cl. ........................................ 359/334
(58) Field of Classification Search ............ 359/334
See application file for complete search history.

(56) References Cited

U.S. PATENT DOCUMENTS

| 6,510,000 B1 | 1/2003 | Onaka et al. |
| 6,697,187 B2 * | 2/2004 | Seydnejad et al. ........... 359/334 |
| 6,704,134 B2 * | 3/2004 | Yokoyama ................... 359/334 |
| 6,785,042 B1 * | 8/2004 | Onaka et al. ................. 359/334 |
| 7,068,421 B2 | 6/2006 | Tokura et al. |
| 7,106,499 B2 * | 9/2006 | Sekiya ......................... 359/334 |
| 2002/0181074 A1 * | 12/2002 | Seydnejad et al. ........... 359/334 |
| 2003/0095323 A1 * | 5/2003 | Onaka et al. ................. 359/334 |
| 2003/0137720 A1 * | 7/2003 | Onaka et al. ................. 359/334 |
| 2003/0147124 A1 * | 8/2003 | Inoue ........................ 359/341.3 |
| 2004/0136053 A1 | 7/2004 | Sugiya |
| 2004/0196158 A1 | 10/2004 | Sugaya et al. |
| 2004/0252999 A1 | 12/2004 | Onaka et al. |
| 2005/0024712 A1 * | 2/2005 | Hiraizumi et al. ........... 359/334 |
| 2005/0099676 A1 | 5/2005 | Tokura et al. |
| 2008/0049303 A1 * | 2/2008 | Nakata ........................ 359/334 |
| 2008/0123180 A1 | 5/2008 | Nakata |
| 2009/0153951 A1 | 6/2009 | Hiraizumi et al. |
| 2009/0190206 A1 * | 7/2009 | Onaka et al. ................. 359/334 |

FOREIGN PATENT DOCUMENTS

| JP | 2001-7768 | 1/2001 |
| JP | 2002-76482 | 3/2002 |
| JP | 2003-233095 | 8/2003 |
| JP | 2004-158652 | 6/2004 |
| JP | 2004-193640 | 7/2004 |
| JP | 2004-287307 | 10/2004 |
| JP | 2004-361979 | 12/2004 |
| JP | 2006-189465 | 7/2006 |
| WO | WO 2005/013518 | 2/2005 |
| WO | WO 2006/137123 | 12/2006 |

* cited by examiner

*Primary Examiner* — Eric Bolda
(74) *Attorney, Agent, or Firm* — Staas & Halsey LLP

(57) ABSTRACT

A light amplifying device including a Raman amplifier to Raman-amplify a signal light by inputting excitation lights of a plurality of wavelengths to a transmission path through which the signal light propagates, a plurality of measuring units measuring powers of light output from the Raman amplifier in a plurality of wavelength bands included in an amplification band of the Raman amplifier, a calculating unit calculating a ratio of the respective powers measured by at least two of the plurality of measuring units, and a control unit controlling a power ratio of the respective excitation lights input to the transmission path by the Raman amplifier based on the ratio calculated by the calculating unit.

11 Claims, 15 Drawing Sheets

RAMAN AMPLIFYING DEVICE AND CONTROL METHOD

CROSS-REFERENCE TO RELATED APPLICATION

This application is based upon and claims the benefit of priority of the prior Japanese Patent Application No. 2008-016430, filed on Jan. 28, 2008, the entire contents of which are incorporated herein by reference.

BACKGROUND OF THE INVENTION

1. Field of The Invention

The present invention relates to a light amplifying device to Raman-amplify a signal light and to a control method.

2. Description of The Related Art

The demand for optical communication apparatuses has been increasing due to an increase in communication traffic in recent years. As optical communication apparatuses are used in a local network or subscriber network, as well as in a backbone network, an optical communication system plays an important role in an information network in the world.

In the optical communication system, an optical amplifier repeated transmission system is used. In this system, an optical amplifier, such as EDFA (Erbium Doped Fiber Amplifier), that amplifies wavelength division multiplexed (WDM) light is provided for each transmission path. The optical amplifier enables long-distance transmission of large capacity with low cost and high reliability. When a transmission loss is high, due to a long transmission path or the like in the optical amplifier repeated transmission system, the power of signal components contained in a light input to the optical amplifier is low, and thus an SN (Signal/Noise) ratio can be degraded and a transmission characteristic can also be degraded.

As measures to avoid such a problem, distributed Raman amplification (DRA) utilizing a Raman effect can be used. In the DRA, excitation light is input to a transmission path so as to amplify a signal light propagating the transmission path, described in Japanese Unexamined Patent Application Publication Nos. 2001-7768, 2002-76482, 2004-287307, 2004-193640, or 2006-189465. Utilizing DRA, the power of signal components contained in a light input to a Raman amplifier increases and thus SN ratio and transmission characteristics are improved. Accordingly, a distributed Raman amplifier has already been in practical use as effective measures.

In the optical communication system, loss of a signal light in a transmission path is high when a repeating interval is long. A transmission loss in a typical transmission path is about 0.2 dB/km. The transmission loss becomes higher in accordance with a repeating distance. When various functional optical components are placed on the transmission path, a insertion loss of those functional optical components is added, further increasing the loss of the signal light. The power of the signal light is lower as a repeating loss is higher.

In optical amplifying apparatus used in optical communication systems, such as an EDFA or a Raman amplifier, noise light increases as the gain of the optical amplifying apparatus becomes higher. Therefore, in a transmission path with a high transmission loss, when a light amplifying apparatus with a high gain is used, the ratio of the power of signal components with respect to the power of noise light contained in a light is small. In the case where a signal light is WDM light, the ratio of the power of signal components with respect to the power of noise light contained in the light is smaller as the number of multiplexed signal lights is smaller.

Also, in the optical communication system, as well as the optical amplifying apparatus to amplify a signal light, a power control device is used to control the power of the signal light to be constant.

For example, a typical power control device supervises total power of a light, which is a sum of the power of the signal components and the power of the noise light, by using a branch coupler and a PD (photodiode), and controls a power of the signal component of each channel on the basis of information about the number of multiplexed signal lights. The information is received from a supervisory signal light transmitted in the optical transmission system.

In the Raman amplification, gain variations occur in respective wavelengths depending on a condition of the transmission path, the number of multiplexed signal lights, or a condition of excitation light. The gain variation causes power variations in respective multiplexed signal lights in output light of the Raman amplifier. The power variations in output light may be compensated by using an optical filter (GEQ: Gain EQualizer) having a fixed loss wavelength characteristic, such as described in above mentioned JP 2002-76482. Still, as the power variations in output light complexly change depending on conditions of a transmission path or the number of multiplexed signal lights, the power variations remain a disadvantage.

The conditions of a transmission path include an optical loss resulting from soil at a connecting portion of an optical connector to connect optical fibers or a bend loss of the optical fibers, manufacture variations in characteristic of a transmission path fiber (a loss coefficient, an effective cross-section area, and so on), loss variations due to fusion in the transmission path fiber, aging degradation, and outside air temperature. Power variations caused in output light are accumulated by an in-line amplifier in a subsequent stage, cause an increase in non-linear phenomena in a transmission path, degradation of the SN ratio, and excess of an allowable value of input power of a receiver, and degrade a transmission characteristic disadvantageously.

On the other hand, as described in above-mentioned JP2001-7768 or JP2002-76482, the power of excitation light can be controlled to obtain a uniform power wavelength characteristic by monitoring a power wavelength characteristic of output light by using a spectrum monitor, such as a spectrum analyzer. However, providing the spectrum monitor causes problems, such as a complicated structure of an optical circuit, complicated control, and an increase in cost and size.

Alternatively, power variations in output light caused depending on various conditions can be managed in a database, as described in above-mentioned JP2006-189465. However, as described above, various conditions of a transmission path change power variations in output light. Accordingly, an enormous amount of data, including all combinations of those conditions, is necessary to be held in order to compensate power variations in output light with high precision.

In addition, even if such an enormous amount of data is held, selecting an appropriate value therefrom requires time. Therefore, it is difficult to monitor and compensate power variations in output light caused by time-dependent factors, such as an optical loss resulting from a bend loss of optical fibers, loss variations due to fusion in transmission path fibers, aging degradation, and outside air temperature, in real time.

SUMMARY OF THE INVENTION

A light amplifying device including a Raman amplifier to Raman-amplify a signal light by inputting excitation lights of a plurality of wavelengths to a transmission path through which the signal light propagates, a plurality of measuring units measuring powers of light output from the Raman amplifier in a plurality of wavelength bands included in an amplification band of the Raman amplifier, a calculating unit calculating a ratio of the respective powers measured by at least two of the plurality of measuring units, and a control unit controlling a power ratio of the respective excitation lights input to the transmission path by the Raman amplifier based on the ratio calculated by the calculating unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF THE PREFERRED EMBODIMENTS

Hereinafter, various embodiments of a light amplifying device and a control method are described in detail with reference to the attached drawings.

First Embodiment

Figure 1:
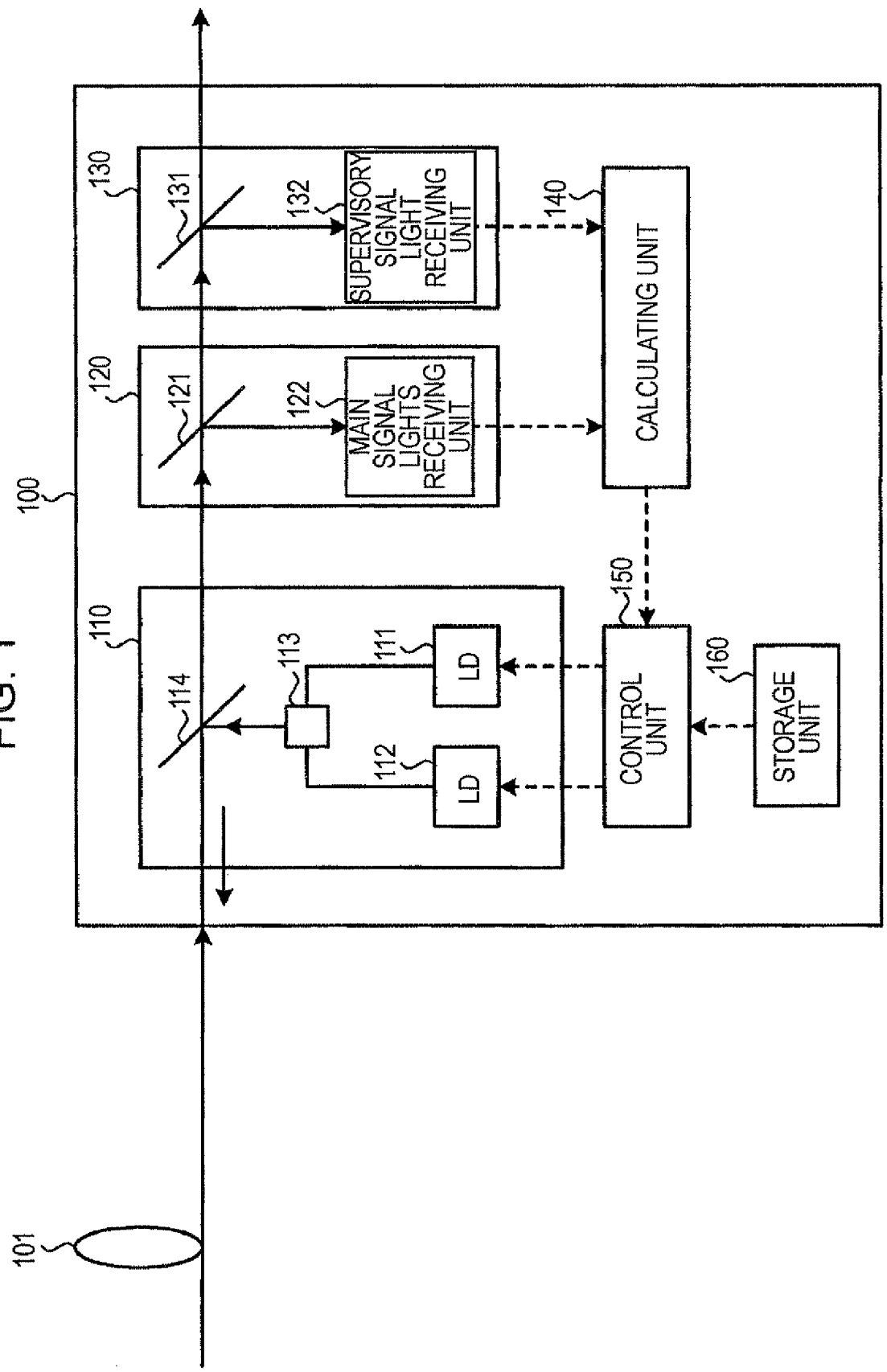
FIG. 1 is a block diagram illustrating a configuration of a light amplifying device according to a first embodiment.

FIG. 1 is a block diagram illustrating a configuration of a light amplifying device according to a first embodiment. In FIG. 1, or following figures, solid-line arrows indicate light paths, whereas dotted-line arrows indicate electricity paths.

As illustrated in FIG. 1, a light amplifying device 100 includes a Raman amplifier 110, first and second measuring units 120 and 130, a calculating unit 140, a control unit 150, and a storage unit 160. The light amplifying device 100 inputs excitation lights of a plurality of wavelengths to a transmission path 101 through which a signal light propagates, so as to Raman-amplify multiplexed signal lights in accordance with the respective wavelengths of the excitation lights.

A signal light transmitted through the transmission path 101, which is located in the previous stage of the light amplifying device 100, is input to the Raman amplifier 110. The signal light contains main signal lights and a supervisory signal light, which includes information about transmission of the main signal lights. The Raman amplifier 110 outputs the signal light transmitted through the transmission path 101 to the first measuring unit 120. Also, the Raman amplifier 110 inputs excitation lights of a plurality of wavelengths to the transmission path 101 in the direction opposite to the direction in which the signal light propagates.

Specifically, the Raman amplifier 110 includes LDs (Laser Diodes) 111 and 112, a coupler 113, and a multiplexer 114. The LDs 111 and 112 output excitation lights of a plurality of wavelengths, respectively. The powers of the respective light beams output from the LDs 111 and 112 are controlled by the control unit 150.

The excitation lights output from the LDs 111 and 112 are coupled by the coupler 113 and are output to the multiplexer 114. The multiplexer 114 outputs a signal light input through the transmission path 101 to the first measuring unit 120. Also, the multiplexer 114 inputs excitation light from the coupler 113 to the transmission path 101. Accordingly, signal lights propagating the transmission path 101, which have wavelengths in wavelength bands corresponding to the respective wavelengths of the excitation lights input to the transmission path 101, are Raman-amplified.

In the following description, a wavelength band that corresponds to the respective wavelengths of excitation lights and that is amplified by the Raman amplifier 110 is called an amplification band. The amplification band is a wavelength band centering a wavelength 100 nm longer than the respective wavelengths of the excitation lights. Here, the wavelengths of the LDs 111 and 112 are set so that the respective bands of the main signal lights and supervisory signal light contained in the signal light are included in the amplification band.

The first and second measuring units 120 and 130 are a plurality of measuring units measuring respective powers in a plurality of bands included in the amplification band of light output from the Raman amplifier 110. Here, the plurality of bands includes a band including the main signal lights and a band including the supervisory signal light contained in the signal light. The first measuring unit 120 measures the power in the band including the main signal lights contained in the signal light. The first measuring unit 120 includes a branch unit 121 and a main signal lights receiving unit 122.

The branch unit 121 (filter unit) allows light output from the Raman amplifier 110 to pass therethrough to a branch unit 131. Also, the branch unit 121 branches part of a light component of the band including the main signal lights in the light output from the Raman amplifier 110 and outputs the branched part to the main signal lights receiving unit 122. The main signal lights receiving unit 122 receives the light output from the branch unit 121. The main signal lights receiving unit 122 outputs an electric signal corresponding to the power of the received light to the calculating unit 140.

The second measuring unit 130 measures the power in the band including the supervisory signal light contained in the signal light. The second measuring unit 130 includes the branch unit 131 and a supervisory signal light receiving unit

132. The branch unit 131 (filter unit) allows the light output from the branch unit 121 to pass therethrough to the outside of the light amplifying device 100. Also, the branch unit 131 branches part of a light component of the band including the supervisory signal light from the light output from the branch unit 121 and outputs the branched part to the supervisory signal light receiving unit 132. The supervisory signal light receiving unit 132 receives the light output from the branch unit 131. The supervisory signal light receiving unit 132 outputs an electric signal corresponding to the power of the received light to the calculating unit 140.

The calculating unit 140 calculates the ratio of the respective powers measured by the first and second measuring units 120 and 130. Specifically, the calculating unit 140 calculates the ratio of the power indicated by the electric signal output from the main signal lights receiving unit 122 and the power indicated by the electric signal output from the supervisory signal light receiving unit 132. The calculating unit 140 outputs ratio information, indicating the calculated ratio, to the control unit 150. Also, the calculating unit 140 calculates the total power of the powers measured by the first and second measuring units 120 and 130. The calculating unit 140 outputs power information, indicating the calculated total power, to the control unit 150.

The control unit 150 controls the power ratio of the respective excitation lights input to the transmission path 101 by the Raman amplifier 110 on the basis of the ratio calculated by the calculating unit 140. Specifically, the control unit 150 controls the power ratio of the respective excitation lights output from the LDs 111 and 112 so that the ratio indicated by the ratio information output from the calculating unit 140 has a predetermined target ratio value.

Also, the control unit 150 controls the Raman amplifier 110 so as to input respective excitation lights to the transmission path 101 before input of a signal light when the light amplifying device 100 is driven. When the signal light is not input, only noise light is output from the back side of the Raman amplifier 110. The control unit 150 controls the power ratio of the respective excitation lights so that the ratio indicated by the ratio information output from the calculating unit 140 at that time has the target ratio value. The calculating unit 140 and the control unit 150 can be realized by a CPU (Central Processing Unit), for example.

The target ratio value is stored in the storing unit 160 in advance. The control unit 150 reads the target ratio value stored in the storing unit 160. The control unit 150 controls the power ratio of the respective excitation lights input to the transmission path 101 by the Raman amplifier 110 so that the ratio indicated by the ratio information output from the calculating unit 140 has the target ratio value read from the storage unit 160.

The target ratio value is the ratio of powers of noise light in the band including the main signal lights and in the band including the supervisory signal light when the power wavelength characteristic of the band including the main signal lights contained in the signal light output from the light amplifying device 100 becomes even. The target ratio value is set by monitoring the spectrum of output light of the Raman amplifier 110 by using a spectrum analyzer or the like when the light amplifying device 100 is designed.

For example, a test signal light is input to the light amplifying device 100, and the power ratio of the respective excitation lights is changed while monitoring the spectrum of the signal light output from the Raman amplifier 110. Then, input of the signal light is stopped in the state where the band including the main signal lights of the spectrum has become even, and the ratio indicated by the ratio information output from the calculating unit 140 at the time is set as the target ratio value.

Also, after controlling the power ratio of the respective excitation lights, the control unit 150 controls the total power of the excitation lights while maintaining the power ratio before inputting a signal light. For example, the control unit 150 controls the total power of the excitation lights so that the total power indicated by the power information output from the calculating unit 140 has a target power value while maintaining the power ratio of the respective excitation lights input to the transmission path 101 by the Raman amplifier 110. Accordingly, the gain with respect to a Raman-amplified signal light is adjusted.

In the description above, the control unit 150 controls the total power of the excitation lights so that the total power indicated by the power information output from the calculating unit 140 has the target power value. The control unit 150 may control the total power of the excitation lights on the basis of at least one of the powers measured by the first and second measuring units 120 and 130. For example, the control unit 150 controls the total power of the excitation lights so that the power indicated by the electric signal output from the first measuring unit 120 has a target power value (different from the above-described target power value).

The target power value is stored in the storage unit 160 in advance. The control unit 150 reads the target power value stored in the storage unit 160. The control unit 150 controls the total power of the excitation lights so that the total power indicated by the power information output from the calculating unit 140 has the target power value read from the storage unit 160.

The target power value is at least one of the powers measured by the first and second measuring units 120 and 130 (also including the total power of the measured powers) when the gain of the main signal lights contained in the signal light output from the light amplifying device 100 or the power of the signal light output from the light amplifying device 100 has a desired value. The target power value is set by monitoring the power of output light of the Raman amplifier 110 when the light amplifying device 100 is designed.

For example, a test signal light is input to the light amplifying device 100 and the total power of the excitation lights is changed while monitoring the power of the signal light output from the Raman amplifier 110. Then, in the state where the gain of the main signal lights contained in the signal light output from the light amplifying device 100 has a desired value, input of the signal light is stopped. Then, the total power indicated by the power information output from the calculating unit 140 at the time is set as the target power value.

Figure 2:
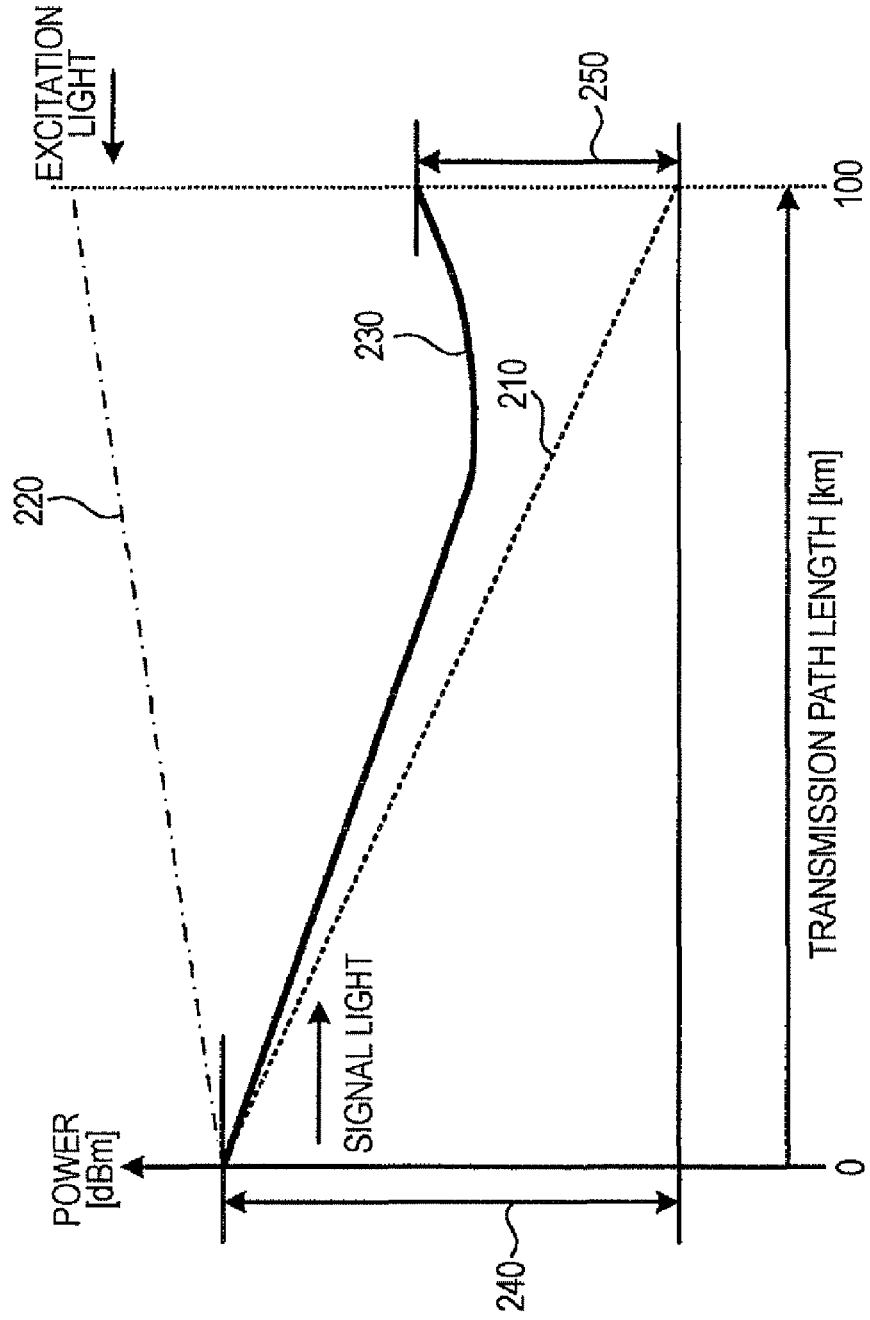
FIG. 2 is a graph showing Raman amplification of a signal light in a transmission path.

FIG. 2 is a graph showing Raman amplification of a signal light in a transmission path. In FIG. 2, the horizontal axis indicates the length [km] of the transmission path 101. The right side of the horizontal axis corresponds to the light amplifying device 100, whereas the left side of the horizontal axis corresponds to an optical communication apparatus in the previous stage of the light amplifying device 100. The vertical axis indicates the power [dBm] of respective light beams propagating the transmission path 101.

A dotted line 210 indicates changes in power of a signal light in the case where no excitation light is input to the transmission path 101 by the Raman amplifier 110. As indicated by the dotted line 210, the signal light is not Raman-amplified when no excitation light is input to the transmission path 101, and the power of the signal light deceases as the signal light propagates in the transmission path 101. A span loss of the signal light is indicated by a difference 240 between the power of the signal light at the time when the signal light is input to the transmission path 101 and the power of the signal light at the time when the signal light is input to the light amplifying device 100 after propagating the transmission path 101.

A broken line 220 indicates changes in power of excitation light input to the transmission path 101 by the Raman amplifier 110. As indicated by the broken line 220, the excitation light input to the transmission path 101 has the highest power when being input by the Raman amplifier 110, and the power decreases as the excitation light propagates in the transmission path 101. Thus, the signal light propagating the transmission path 101 encounters excitation light of higher power as the signal light approaches the light amplifying device 100, thereby being Raman-amplified.

A solid line 230 indicates changes in power of the signal light in the case where excitation light is input to the transmission path 101 by the Raman amplifier 110. Since the signal light propagating the transmission path 101 encounters excitation light of higher power as the signal light approaches the light amplifying device 100, the gain obtained by Raman amplification is higher at a position closer to the light amplifying device 100.

The gain of the signal light obtained by Raman amplification is indicated by a difference 250 between the power of the signal light in the case where no excitation light is input to the transmission path 101 by the Raman amplifier 110 and the power of the signal light in the case where excitation light is input to the transmission path 101 by the Raman amplifier 110.

Figure 3:
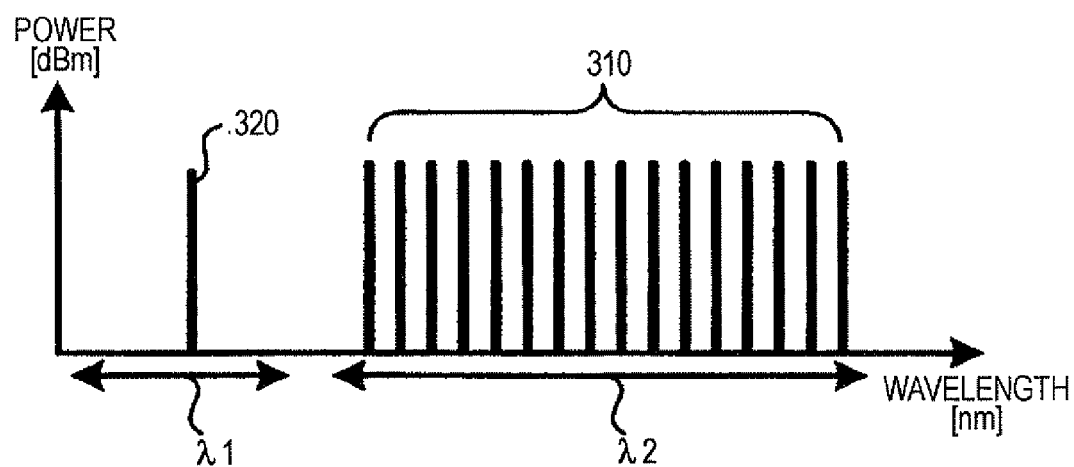
FIG. 3 is a graph showing respective components contained in a signal light.

FIG. 3 is a graph showing respective signal light components contained in a signal light. In FIG. 3, the horizontal axis indicates the wavelength [nm] of the signal light input to the light amplifying device 100. The vertical axis indicates the power [dBm] of each light component of the signal light. Reference numeral 310 denotes main signal lights contained in the signal light. Reference numeral 320 denotes a supervisory signal light contained in the signal light.

Main signal lights band $\lambda 2$ is a wavelength band of the main signal lights contained in the signal light. A supervisory signal light band $\lambda 1$ is a wavelength band of the supervisory signal light contained in the signal light. The supervisory signal light band $\lambda 1$ is set on the shorter wavelength side with respect to the main signal lights band $\lambda 2$. The signal light input to the light amplifying device 100 is a WDM signal light in which a plurality of main signal lights is wavelength-division multiplexed. As indicated by reference numeral 310, the signal light contains a plurality of main signal lights of different wavelengths in the main signal lights band $\lambda 2$, which are wavelength-division multiplexed.

Figure 4:
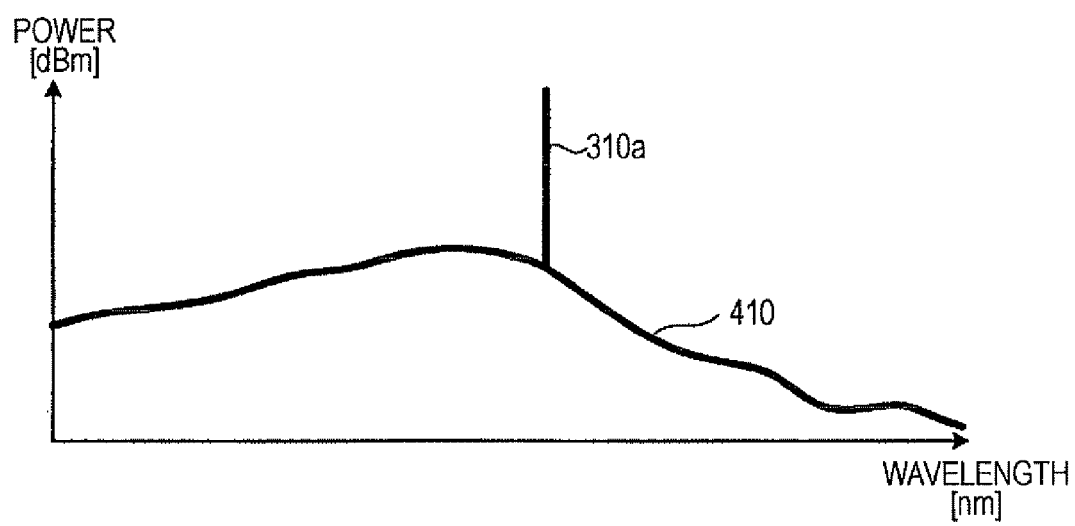
FIG. 4 is a graph showing main signal lights and noise light contained in a signal light.

FIG. 4 is a graph showing main signal lights and noise light contained in the signal light. In FIG. 4, reference numeral 310a denotes one of the main signal lights denoted by reference numeral 310 in FIG. 3. Reference numeral 410 denotes noise light that is generated when the Raman amplifier 110 inputs excitation light to the transmission path 101 and that is output from the back side of the Raman amplifier 110 to the branch unit 121. The noise light 410 is generated even when no signal light is input to the Raman amplifier 110.

Figure 5:
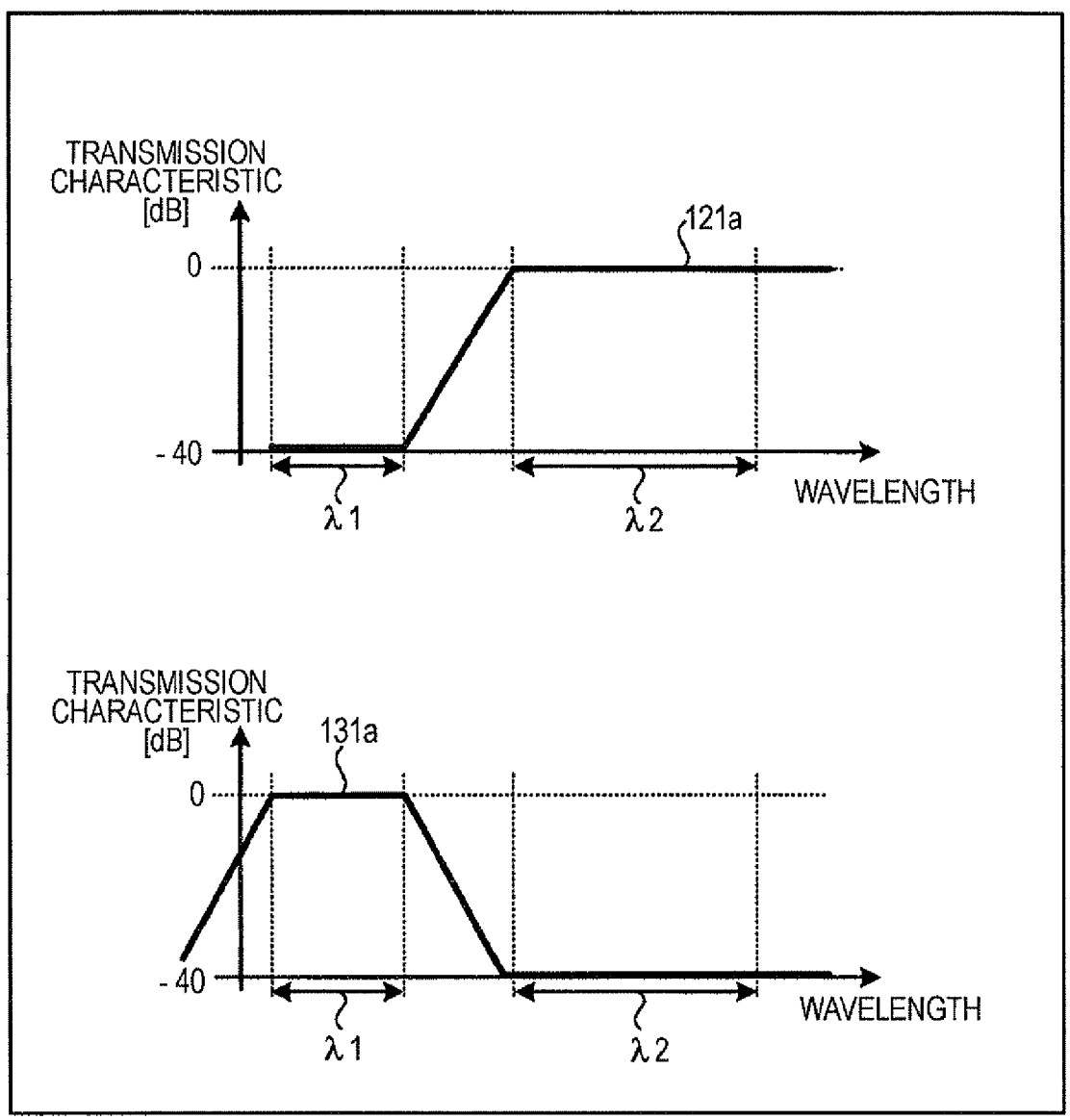
FIG. 5 includes graphs showing an example of wavelength transmission characteristics of respective branch units illustrated in FIG. 1.

FIG. 5 includes graphs showing an example of a wavelength transmission characteristic of the respective branch units illustrated in FIG. 1. In FIG. 5, the horizontal axis indicates wavelength. The vertical axis indicates transmission characteristic [dB]. Reference numeral 121a denotes a wavelength transmission characteristic of the branch unit 121 included in the first measuring unit 120 with respect to the path toward the main signal lights receiving unit 122. Reference numeral 131a denotes a wavelength transmission characteristic of the branch unit 131 included in the second measuring unit 130 with respect to the path toward the supervisory signal light receiving unit 132.

As indicated by the wavelength transmission characteristic 121a, the branch unit 121 functions as a high-pass filter to transmit a light component of the main signal lights band $\lambda 2$ or longer wavelength, and attenuate a light component of the supervisory signal light band $\lambda 1$ or less with respect to the path toward the main signal lights receiving unit 122. In the branch unit 121, the transmission characteristic of the light component of the main signal lights band $\lambda 2$ is 0 dB, whereas the transmission characteristic of the light component of the supervisory signal light band $\lambda 1$ is −40 dB.

As indicated by the wavelength transmission characteristic 131a, the branch unit 131 functions as a bandpass filter to transmit a light component of the supervisory signal light band $\lambda 1$ and attenuate a light component of the main signal lights band $\lambda 2$ or more with respect to the path toward the supervisory signal light receiving unit 132. In the branch unit 131, the transmission characteristic of the light component of the main signal lights band $\lambda 2$ is −40 dB, whereas the transmission characteristic of the light component of the supervisory signal light band $\lambda 1$ is 0 dB.

Figure 6:
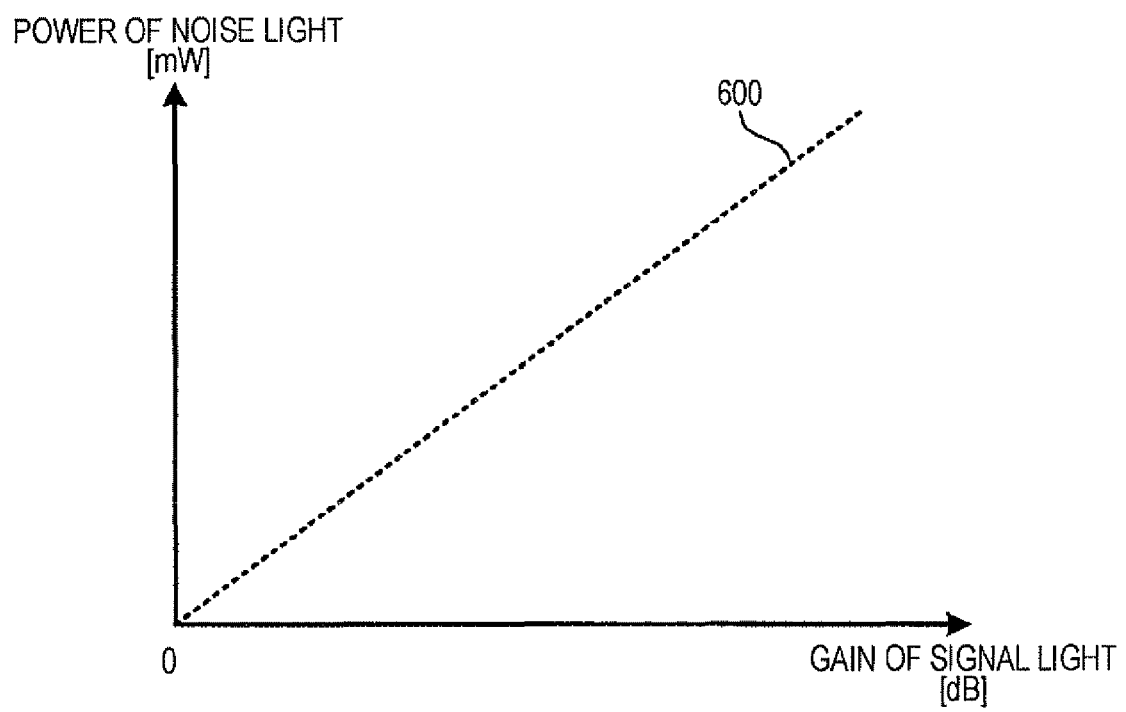
FIG. 6 is a graph showing the relationship between the gain of a signal light and the power of noise light.

FIG. 6 is a graph showing the relationship between the gain of a signal light and the power of noise light. In FIG. 6, the horizontal axis indicates the gain [dBm] of a signal light amplified by the Raman amplifier 110. The vertical axis indicates the power [dB] of noise light in the signal light generated by Raman amplification. A power characteristic 600 indicates the characteristic of the power of the noise light with respect to the gain of the signal light. As indicated by the power characteristic 600, the gain of the signal light is proportional to the power of the noise light.

The control unit 150 calculates a proportional coefficient "a" between the gain of the signal light and the power of the noise light in advance. Before the signal light is input to the light amplifying device 100, the total power indicated by information output from the calculating unit 140 corresponds to the total power of noise light in the main signal lights band $\lambda 2$ and the supervisory signal light band $\lambda 1$, which corresponds to the vertical axis in the power characteristic 600.

Thus, the control unit 150 can calculate the power of noise light (target power value) enabling the gain to the signal light to be a desired value by using the proportional coefficient "a". The control unit 150 stores the calculated target power value in the storage unit 160 in advance. In order to calculate the proportional coefficient "a", the gain of the signal light needs to be calculated. As a method for calculating the gain, various methods described herein and so on can be used.

Figure 7:
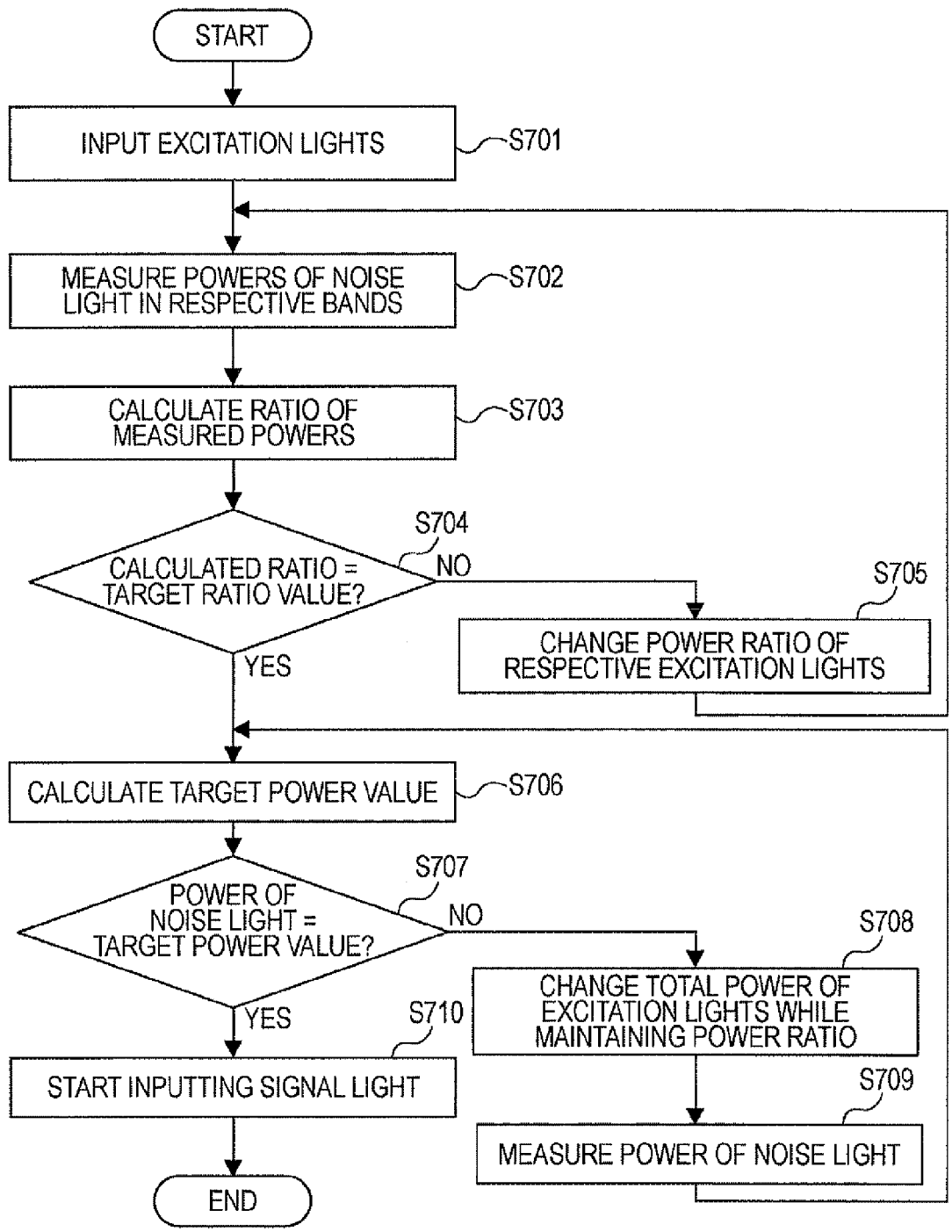
FIG. 7 is a flowchart illustrating an example of a drive operation of the light amplifying device illustrated in FIG. 1.

FIG. 7 is a flowchart illustrating an example of a drive operation of the light amplifying device illustrated in FIG. 1. Before input of a signal light to the transmission path 101, the control unit 150 controls the Raman amplifier 110 so as to input excitation lights to the transmission path 101 (step S701). Accordingly, noise light corresponding to the respective excitation lights is output from the back side of the Raman amplifier 110.

Then, the first and second measuring units 120 and 130 measure the powers of the noise light in the main signal lights band $\lambda 2$ and in the supervisory signal light band $\lambda 1$, respectively (step S702). Then, the calculating unit 140 calculates the ratio of the powers measured in step S702 (step S703).

Then, the control unit 150 determines whether the ratio calculated in step S703 is equal to the target ratio value (step S704). If the calculated ratio is not equal to the target ratio value (NO in step S704), the control unit 150 changes the power ratio of the respective excitation lights input to the transmission path 101 (step S705). Then, the process returns to step S702 and the process continues.

If it is determined in step S704 that the calculated ratio is equal to the target ratio value (YES in step S704), a target power value of the noise light in the main signal lights band λ2 enabling the Raman amplifier 110 to realize a predetermined gain or output is calculated (step S706).

Then, it is determined whether the power of the noise light in the main signal lights band λ2 measured in step S702 or S709 is equal to the target power value calculated in step S706 (step S707). If the power of the noise light is not equal to the target power value (NO in step S707), the control unit 150 changes the total power of the excitation lights while maintaining the power ratio of the respective excitation lights at this time (step S708, second control step).

Then, the first measuring unit 120 measures the power of the noise light in the main signal lights band λ2 output from the Raman amplifier 110 (step S709), and the process returns to step S706 and the process continues. If it is determined in step S707 that the power of the noise light is equal to the target power value (YES in step S707), input of a signal light to the transmission path 101 starts (step S710), and the drive operation ends.

As described above, in the light amplifying device 100 according to the first embodiment, the powers of light output from the Raman amplifier 110 in a plurality of bands included in the amplification band of the Raman amplifier 110 are measured, and the power ratio of respective excitation lights is controlled on the basis of the ratio of the measured powers. Accordingly, the power wavelength characteristic of a Raman-amplified signal light can be made uniform.

The storage unit 160 may store the ratio when the power wavelength characteristic of the signal light becomes uniform as information to control the power of the respective excitation lights, and thus the amount of information can be reduced compared to the case where power variations in output light depending on various conditions are managed in a database. Accordingly, the power of respective excitation lights can be controlled at high speed.

By using the main signal lights band λ2 and the supervisory signal light band λ1 as a plurality of bands where power is measured, each power can be measured by using an existing configuration. Therefore, the light amplifying device 100 according to the first embodiment can be realized with a simple configuration without being provided with a new optical component.

By controlling the power ratio of the respective excitation lights and then controlling the total power of the excitation lights while maintaining the power ratio, the gain to a Raman-amplified signal light can be adjusted while keeping the power wavelength characteristic of the Raman-amplified signal light uniform.

<Second Embodiment>

Figure 8:
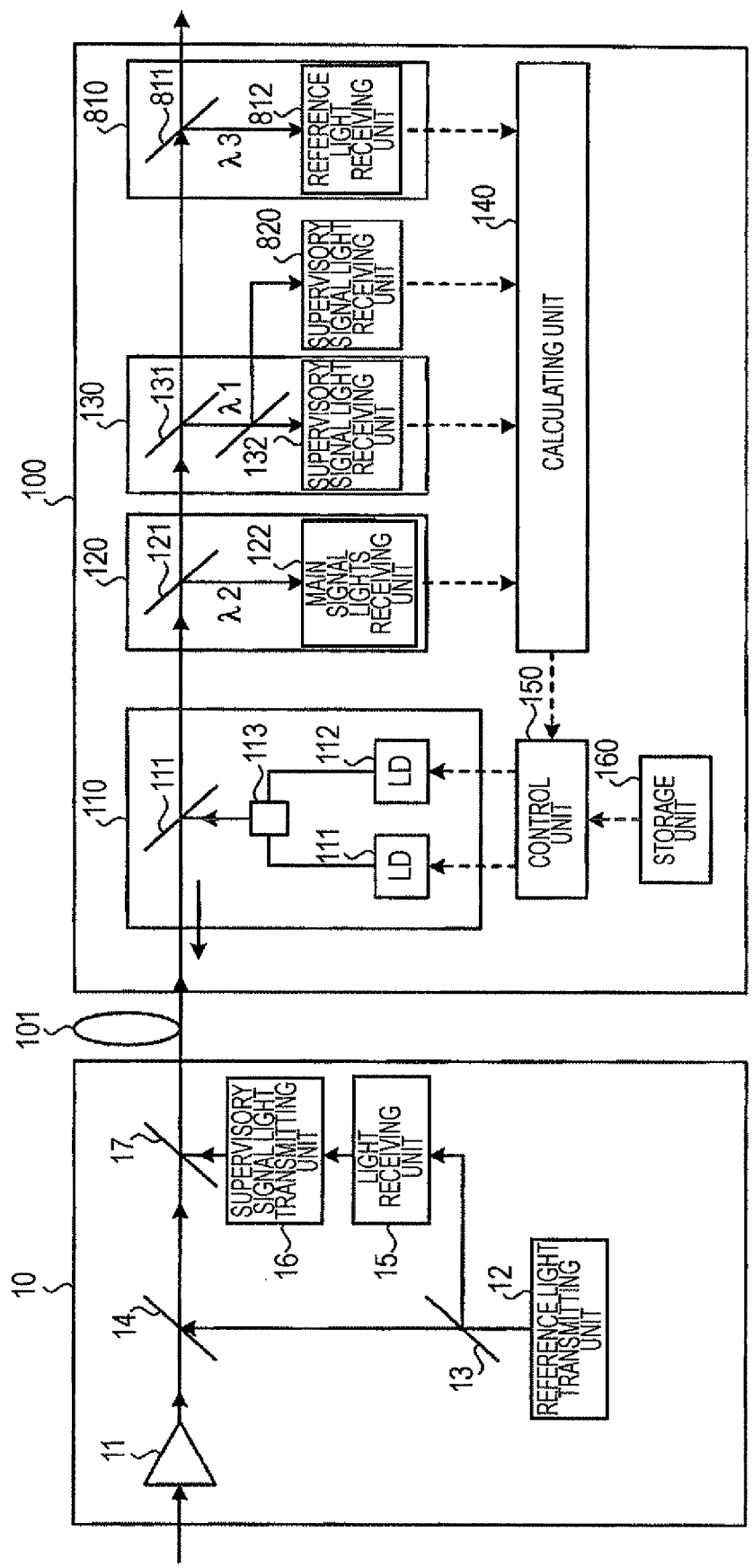
FIG. 8 is a block diagram illustrating a configuration of a light amplifying device according to a second embodiment.

FIG. 8 is a block diagram illustrating a configuration of a light amplifying device according to a second embodiment. In FIG. 8, the elements same as those illustrated in FIG. 1 are denoted by the same reference numerals and the corresponding description is omitted. An optical communication apparatus 10 is provided in the previous stage of the light amplifying device 100. The optical communication apparatus 10 connects to the light amplifying device 100 through the transmission path 101. The optical communication apparatus 10 includes an amplifying unit 11, a reference light transmitting unit 12, a branch unit 13, a multiplexer 14, a light receiving unit 15, a supervisory signal light transmitting unit 16, and a multiplexer 17.

A signal light input to the optical communication apparatus 10 is amplified by the amplifying unit 11. The amplifying unit 11 outputs the amplified signal light to the multiplexer 14. The reference light transmitting unit 12 outputs gain reference light to the branch unit 13. The gain reference light output from the reference light transmitting unit 12 has constant power and is light having a wavelength different from that of the main signal lights and supervisory signal light contained in the signal light.

The branch unit 13 branches the gain reference light output from the reference light transmitting unit 12 and outputs the respective branched gain reference light beams to the multiplexer 14 and the light receiving unit 15. The multiplexer 14 superimposes the gain reference light output from the branch unit 13 on the signal light output from the amplifying unit 11 and outputs the multiplexed signal light to the multiplexer 17. The light receiving unit 15 receives the gain reference light output from the branch unit 13 and outputs an electric signal corresponding to the power of the gain reference light to the supervisory signal light transmitting unit 16.

The supervisory signal light transmitting unit 16 outputs a supervisory signal light, which includes information about the power of the gain reference light indicated by the electric signal output from the light receiving unit 15, to the multiplexer 17. The supervisory signal light is a signal that has a wavelength different from that of the main signal lights contained in the signal light and that uses a supervisory dedicated channel (Optical Supervisor Channel). The multiplexer 17 superimposes the information output from the supervisory signal light transmitting unit 16 on the signal light output from the multiplexer 14. The multiplexer 17 transmits the multiplexed signal light to the light amplifying device 100 through the optical path 101.

Here, a description has been given about the case where the supervisory signal light transmitting unit 16 outputs the supervisory signal light, which is the information about the power of the gain reference light indicated by the electric signal output from the light receiving unit 15. Alternatively, light receiving units receiving the power of the main signal lights and supervisory signal light in addition to the gain reference light may be provided, and information about the power of the main signal lights and supervisory signal light indicated by the electric signal output from the receiving unit may be output as a supervisory signal light.

The light amplifying device 100 includes a third measuring unit 810 and a supervisory signal light receiving unit 820 in addition to the elements illustrated in FIG. 1. The third measuring unit 810 includes a branch unit 811 and a reference light receiving unit 812. The branch unit 811 (filter unit) allows light output from the branch unit 131 to pass therethrough to the outside. Also, the branch unit 811 branches part of the gain reference light contained in the light output from the branch unit 131 and outputs the branched part to the reference light receiving unit 812.

The reference light receiving unit 812 receives the light output from the branch unit 811 and outputs an electric signal corresponding to the power of the received light to the calculating unit 140. The supervisory signal light receiving unit 820 receives a branched part of the supervisory signal light output from the branch unit 131 to the supervisory signal light receiving unit 132. The supervisory signal light receiving unit 820 obtains, from the received supervisory signal light, information about the powers of the main signal lights, supervisory signal light, and gain reference light contained in the signal light before they are input to the transmission path 101. The supervisory signal light receiving unit 820 outputs the obtained information to the calculating unit 140.

The calculating unit 140 has a function as gain calculating units calculating respective gains in the main signal lights band λ2, the supervisory signal light band λ1, and the band including gain reference light (λ3, see FIG. 9) of the light output from the Raman amplifier 110 on the basis of the respective powers measured by the first, second, and third measuring units 120, 130, and 810 while a signal light is input to the light amplifying device 100.

Here, the calculating unit 140 calculates the gains in the respective bands on the basis of subtraction of the powers measured by the first, second, and third measuring units 120, 130, and 810, and the respective powers indicated by the information output from the supervisory signal light receiving unit 820. As a method for calculating the gains, various methods described herein and so on can be used.

Also, the calculating unit 140 has a function as gain ratio calculating units calculating the ratio of the calculated gains. Here, the calculating unit 140 calculates the gains in the following three bands: the main signal lights band $\lambda 2$; the supervisory signal light band $\lambda 1$; and the band including the reference light, and thus calculates the ratio of the three gains. The calculating unit 140 outputs gain ratio information indicating the calculated ratio to the control unit 150.

Here, a description has been given about the case where the calculating unit 140 calculates the gains in the three bands. Note that the calculating unit 140 may calculate the gains in at least two of the three bands. When the calculating unit 140 calculates the gains in two bands, the calculating unit 140 calculates the ratio of the calculated two gains and outputs gain ratio information indicating the calculated ratio to the control unit 150.

The control unit 150 controls the total power of excitation lights, and then performs control of finely adjusting the power ratio of the respective excitation lights on the basis of the ratio of the gains calculated by the calculating unit 140 while a signal light is being input. For example, the control unit 150 finely adjusts the power ratio of the respective excitation lights so that the ratio indicated by the gain ratio information output from the calculating unit 140 has a predetermined target gain ratio value while maintaining the total power of the excitation lights input to the transmission path 101 by the Raman amplifier 110.

The target gain ratio value is stored in the storage unit 160 (gain ratio storage means) in advance. The control unit 150 reads the target gain ratio value stored in the storage unit 160. For example, the control unit 150 controls the power ratio of the respective excitation lights so that the ratio indicated by the gain ratio information output from the calculating unit 140 has the target gain ratio value read from the storage unit 160.

The target gain ratio value is the ratio of the respective gains of the main signal lights, the supervisory signal light, and the gain reference light when the power wavelength characteristic of the bands including the main signal lights contained in the signal light output from the light amplifying device 100 is even. The target gain ratio value is set by monitoring the spectrum of output light of the Raman amplifier 110 by using a spectrum analyzer or the like when the light amplifying device 100 is designed.

For example, a test signal light is input to the light amplifying device 100, and the power ratio of the respective excitation lights is changed while monitoring the spectrum of the signal light output from the Raman amplifier 110. Then, the ratio indicated by the gain ratio information output from the calculating unit 140 when the main signal lights band $\lambda 2$ of the spectrum becomes even is set as the target gain ratio value.

Figure 9:
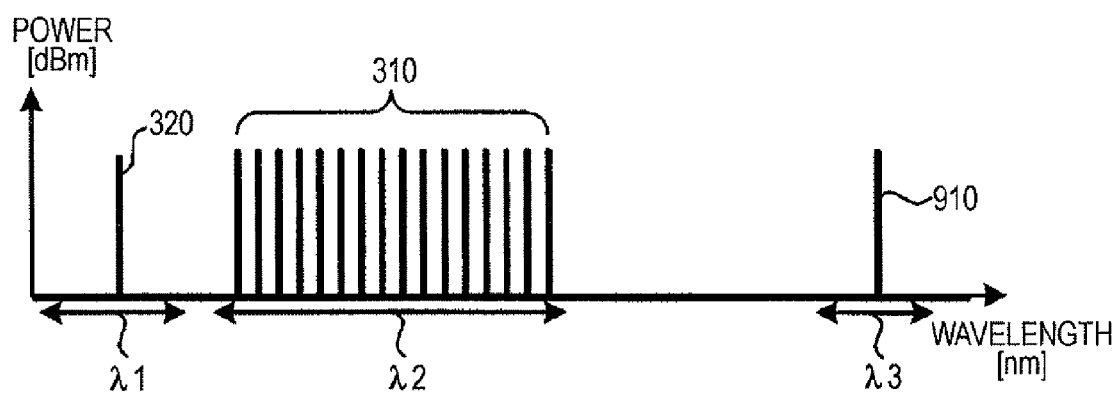
FIG. 9 is a graph showing respective components contained in a signal light.

FIG. 9 is a graph showing respective components contained in a signal light. In FIG. 9, the elements same as those illustrated in FIG. 3 are denoted by the same reference numerals and the corresponding description is omitted. Reference numeral 910 denotes gain reference light contained in the signal light. The reference light band $\lambda 3$ is a wavelength band of the gain reference light contained in the signal light. The reference light band $\lambda 3$ is set on the long wavelength side with respect to the main signal lights band $\lambda 2$.

Figure 10:
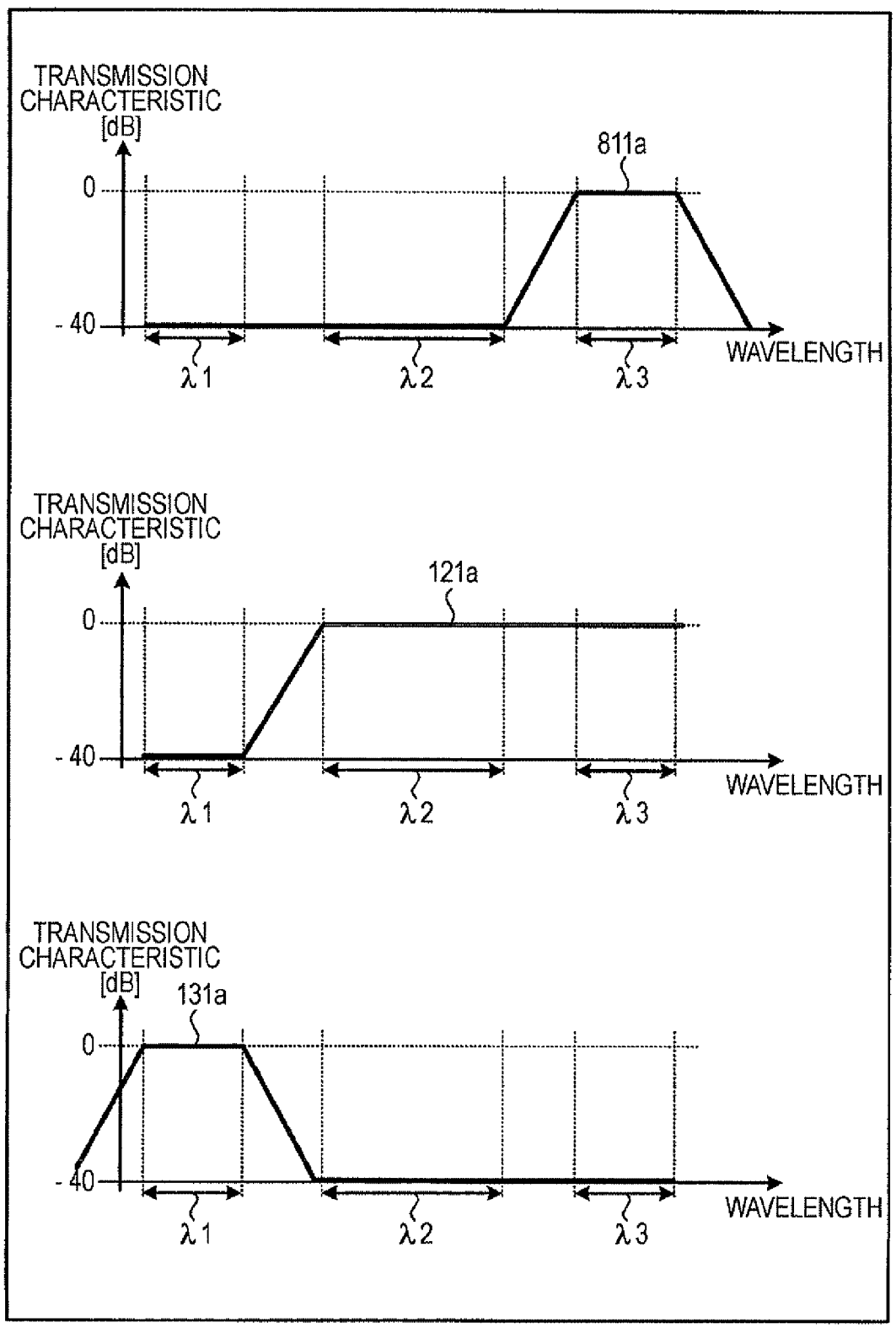
FIG. 10 includes graphs showing an example of wavelength transmission characteristics of respective branch units illustrated in FIG. 8.

FIG. 10 includes graphs showing an example of wavelength transmission characteristics of the respective branch unit illustrated in FIG. 8. In FIG. 10, the elements same as those illustrated in FIG. 5 are denoted by the same reference numerals and the corresponding description is omitted. The horizontal axis indicates wavelength. The vertical axis indicates transmission characteristic [dB]. Reference numeral 811a denotes a wavelength transmission characteristic of the branch unit 811 with respect to the path toward the reference light receiving unit 812.

As indicated by the wavelength transmission characteristic 811a, the branch unit 811 functions as a bandpass filter to transmit a light component of the reference light band $\lambda 3$ and attenuate a light component of the main signal lights band $\lambda 2$ or less with respect to the path toward the reference light receiving unit 812. In the branch unit 811, the transmission characteristic of the light component of the reference light band $\lambda 3$ is 0 dB, whereas the transmission characteristic of the light component of the main signal lights band $\lambda 2$ and the supervisory signal light band $\lambda 1$ is −40 dB.

As indicated by the wavelength transmission characteristic 121a, in the branch unit 121, the transmission characteristic of the light component of the main signal lights band $\lambda 2$ and the reference light band $\lambda 3$ is 0 dB, whereas the transmission characteristic of the light component of the supervisory signal light band $\lambda 1$ is −40 dB. As indicated by the wavelength transmission characteristic 131a, in the branch unit 131, the transmission characteristic of the light component of the main signal lights band $\lambda 2$ and the reference light band $\lambda 3$ is −40 dB, whereas the transmission characteristic of the light component of the supervisory signal light band $\lambda 1$ is 0 dB.

Figure 11:
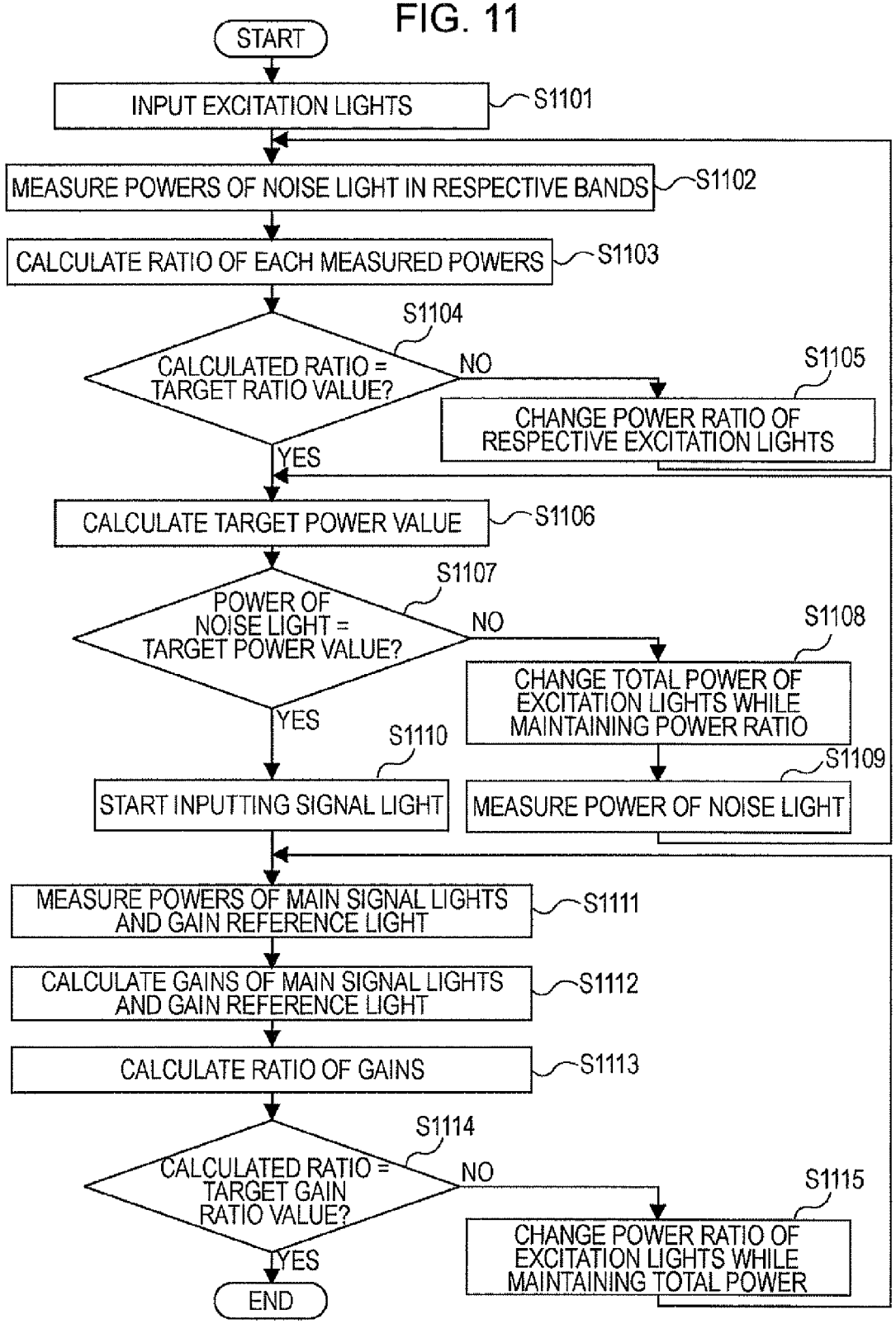
FIG. 11 is a flowchart illustrating an example of a drive operation of the light amplifying device illustrated in FIG. 8.

FIG. 11 is a flowchart illustrating an example of a drive operation of the light amplifying device illustrated in FIG. 8. Here, a description is given about the case where the main signal lights band $\lambda 2$ and the reference light band $\lambda 3$ measured by the first and third measuring units 120 and 810 are used as a plurality of bands included in the amplification band. In FIG. 11, steps S1101 to S1110 are the same as steps S701 to S710 illustrated in FIG. 7 and thus the description thereof is omitted.

Note that, however, the steps (S702 and S709) of measuring powers of noise light in the main signal lights band $\lambda 2$ and the supervisory signal light band $\lambda 1$ by the first and second measuring units 120 and 130 in FIG. 7 are replaced by steps (S1102 and S1109) of measuring powers of noise light in the main signal lights band $\lambda 2$ and the reference light band $\lambda 3$ by the first and third measuring units 120 and 810 in FIG. 11.

After input of a signal light to the transmission path 101 starts (step S1110), the first and third measuring units 120 and 810 measure the powers of the main signal lights and gain reference light contained in the signal light output from the Raman amplifier 110 (step S1111). Then, the calculating unit 140 calculates the gains of the main signal lights and the gain reference light on the basis of the respective powers measured in step S1111 (step S1112).

Then, the calculating unit 140 calculates the ratio of the respective gains calculated in step S1112 (step S1113). Then, the control unit 150 determines whether the ratio calculated in step S1113 is equal to the target gain ratio value (step S1114). If the ratio is not equal to the target gain ratio value (NO in step S1114), the control unit 150 slightly changes the power ratio of the respective excitation lights input to the transmission path 101 (step S1115, third control step). Then, the process returns to step S1111 and the process continues.

If it is determined in step S1114 that the calculated ratio is equal to the target gain ratio value (YES in step S1114), the drive operation ends. Although not illustrated, even after the drive operation has ended, steps S1111 to S1115 may be repeatedly performed during operation of the light amplifying device 100 and the power ratio of the respective excitation lights may be controlled in real time.

Figure 12:
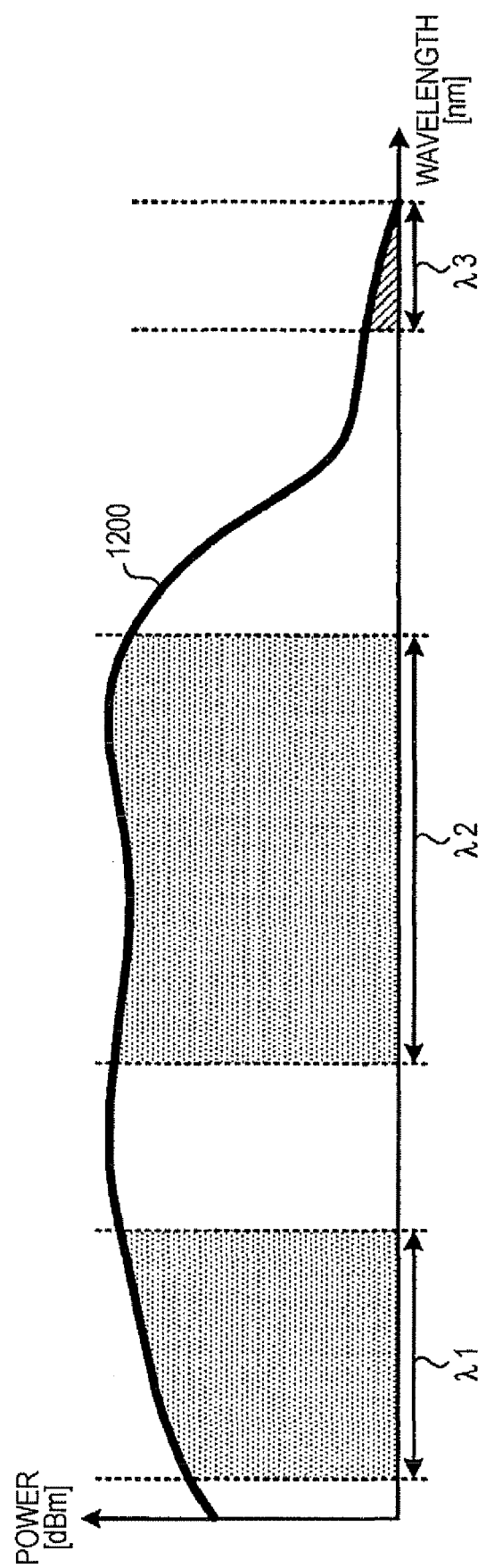
FIG. 12 is a graph showing an example of a spectrum of output light of a Raman amplifier.

FIG. 12 is a graph showing an example of a spectrum of output light from the Raman amplifier. In FIG. 12, the spectrum 1200 is an example of a spectrum obtained by monitoring noise light output from the back side of the Raman amplifier 110 when excitation lights are input to the transmission path 101 by temporarily setting a spectrum analyzer on the back side of the Raman amplifier 110.

The noise light output from the back side of the Raman amplifier 110 and the gain of the signal light in the case where excitation lights are input to the transmission path 101 are phenomena resulting from the same Raman amplification. Thus, the form of the spectrum 1200 corresponds to the wavelength gain characteristic of the signal light at 1:1. Also, the form of the spectrum 1200 is reflected on the ratio of the respective powers measured by the first, second, and third measuring units 120, 130, and 810.

Therefore, when the ratio of the respective powers measured by the first, second, and third measuring units 120, 130, and 810 in the state where the wavelength gain characteristic of the signal light is even is used as the target ratio value, the form of the spectrum 1200 having an even wavelength gain characteristic can be reproduced without using a spectrum analyzer (this is the same in the first embodiment).

Figure 13:
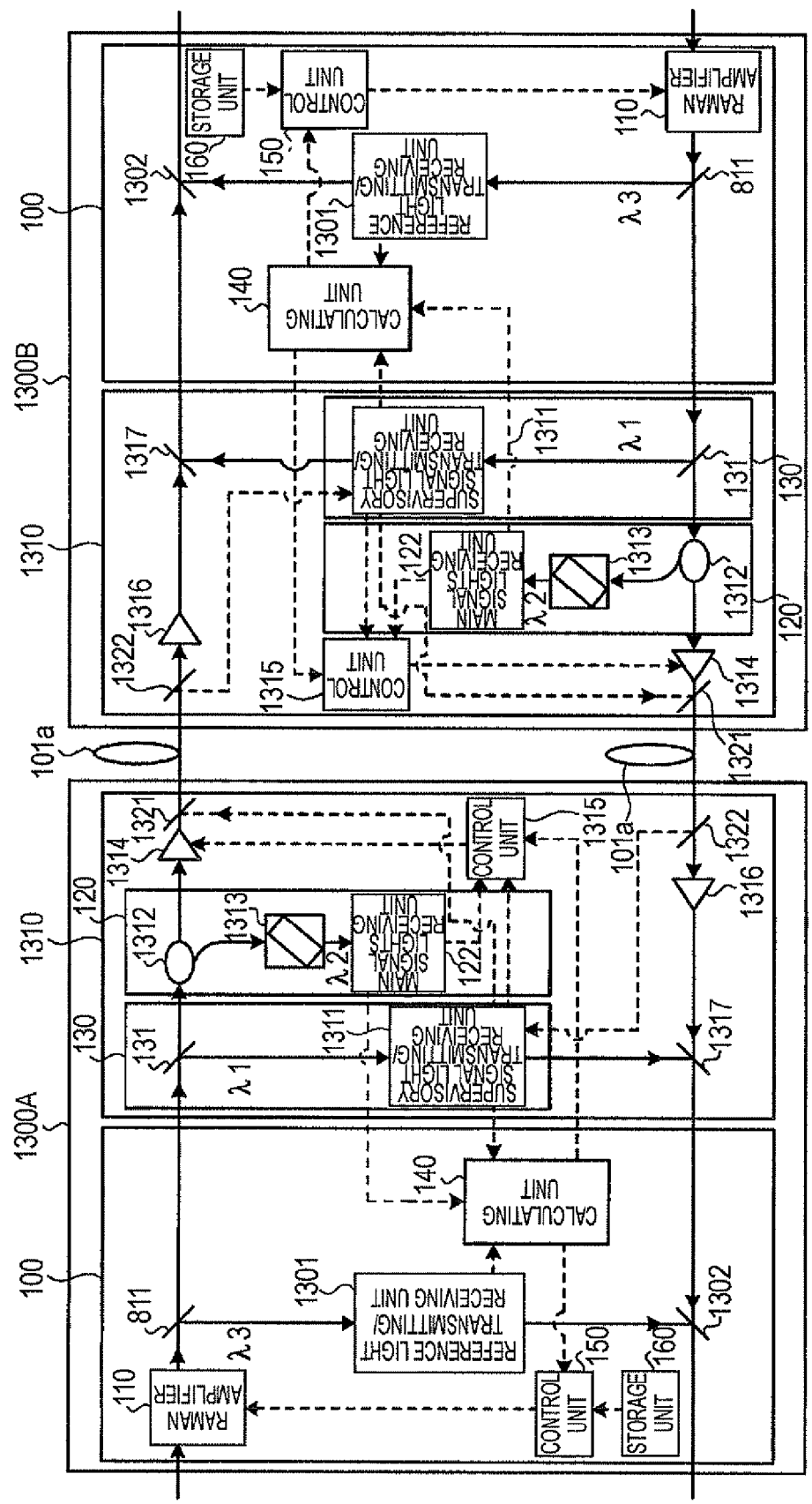
FIG. 13 is a block diagram illustrating a configuration example of optical communication apparatuses to which a modification of the light amplifying device illustrated in FIG. 8 is applied.

FIG. 13 is a block diagram illustrating a configuration example of optical communication apparatuses to which a modification of the light amplifying device illustrated in FIG. 8 is applied. In FIG. 13, the elements same as those illustrated in Fig, 8 are denoted by the same reference numerals and the corresponding description is omitted. As illustrated in FIG. 13, an optical communication apparatus 1300A includes a modification of the light amplifying device 100 illustrated in FIG. 8 and a power control device 1310. The optical communication apparatus 1300A connects to an optical communication apparatus 1300B in the subsequent stage through a transmission path 101a.

The light amplifying device 100 in the optical communication apparatus 1300A includes a reference light transmitting/receiving unit 1301 and a multiplexer 1302 in addition to the elements illustrated in FIG. 8. The branch unit 811 allows the light output from the Raman amplifier 110 to pass therethrough to the power control device 1310 and branches part of the gain reference light contained in the light output from the Raman amplifier 110 so as to output the branched part to the reference light transmitting/receiving unit 1301. The reference light transmitting/receiving unit 1301 receives the light output from the branch unit 811 like the reference light receiving unit 812 illustrated in FIG. 8 and outputs an electric signal corresponding to the power of the received light to the calculating unit 140.

Also, the reference light transmitting/receiving unit 1301 outputs the gain reference light to the multiplexer 1302. The multiplexer 1302 superimposes the gain reference light output from the reference light transmitting/receiving unit 1301 on the light output from the power control device 1310. The light generated through multiplexing by the multiplexer 1302 is transmitted to an optical communication apparatus in the previous stage of the optical communication apparatus 1300A. Here, the first and second measuring units 120 and 130 are provided in the power control device 1310.

The power control device 1310 includes the branch unit 131, a supervisory signal light transmitting/receiving unit 1311, a branch unit 1312, an optical filter 1313, the main signal lights receiving unit 122, an amplifying unit 1314, a control unit 1315, an amplifying unit 1316, and a multiplexer 1317. The second measuring unit 130 includes the branch unit 131 and the supervisory signal light transmitting/receiving unit 1311.

The branch unit 131 allows light output from the branch unit 811 to pass therethrough to the branch unit 1312. Also, the branch unit 131 branches part of a light component of the supervisory signal light band λ1 in the light output from the branch unit 811 and outputs the branched part to the supervisory signal light transmitting/receiving unit 1311. As the supervisory signal light receiving unit 132 illustrated in FIG. 8, the supervisory signal light transmitting/receiving unit 1311 receives the light output from the branch unit 131 and outputs an electric signal corresponding to the power of the received light to the calculating unit 140.

Also, the supervisory signal light transmitting/receiving unit 1311 receives a supervisory signal light output from the branch unit 131. The supervisory signal light received by the supervisory signal light transmitting/receiving unit 1311 contains information about a transmission path, such as the transmission path 101a, and information about the number of multiplexed signal lights of a signal light. The supervisory signal light transmitting/receiving unit 1311 outputs the information about the number of multiplexed signal lights and so on to the control unit 1315. Also, the supervisory signal light transmitting/receiving unit 1311 outputs the received supervisory signal light or a newly-generated supervisory signal light to the multiplexer 1317.

The first measuring unit 120 includes the branch unit 1312, the optical filter 1313, and the main signal lights receiving unit 122. The branch unit 1312 branches the light output from the branch unit 131 and outputs branched light beams to the optical filter 1313 and the amplifying unit 1314, respectively. The optical filter 1313 (filter unit) has the wavelength transmission characteristic same as the wavelength transmission characteristic 121a illustrated in FIG. 10 and allows the light output from the branch unit 1312 to pass therethrough to the main signal lights receiving unit 122. The main signal lights receiving unit 122 receives the light output from the optical filter 1313 and outputs an electric signal corresponding to the power of the received light to the calculating unit 140 and the control unit 1315.

The amplifying unit 1314 amplifies the light output from the branch unit 1312 in accordance with control by the control unit 1315. The light amplified by the amplifying unit 1314 is transmitted to the optical communication apparatus 1300B in the subsequent stage of the optical communication apparatus 1300A via the transmission path 101a. The amplifying unit 1314 is an erbium doped optical fiber amplifier, for example.

The control unit 1315 controls the amplifying unit 1314 on the basis of the power indicated by the electric signal output from the main signal lights receiving unit 122 so that the power of the signal light output from the amplifying unit 1314 has a desired value. Also, the control unit 1315 may calculate the power of a signal component per channel of the signal light by dividing the power indicated by the electric signal output from the main signal lights receiving unit 122 by the number of multiplexed signal lights of the signal light indicated by the information output from the supervisory signal light transmitting/receiving unit 1311.

In this case, the control unit 1315 controls the amplifying unit 1314 on the basis of the calculated power of the signal component per channel of the signal light. The amplifying unit 1316 amplifies the signal light transmitted from the optical communication apparatus 1300B in the subsequent stage of the optical communication apparatus 1300A through the transmission path 101a and outputs the amplified signal light to the multiplexer 1317. The multiplexer 1317 superimposes the supervisory signal light output from the supervisory signal light transmitting/receiving unit 1311 on the signal light output from the amplifying unit 1316. The multiplexer 1317 outputs the signal light generated through the multiplexing to the multiplexer 1302 of the light amplifying device 100.

The supervisory signal light transmitting/receiving unit 1311 outputs a supervisory signal light for the optical communication apparatus in the subsequent stage to the multiplexer 1321 provided in the subsequent stage of the amplifying unit 1314. The multiplexer 1321 superimposes the supervisory signal light output from the supervisory signal light transmitting/receiving unit 1311 on the light to be transmitted from the amplifying unit 1314 to the optical communication apparatus in the subsequent stage. The branch unit 1322 is provided in the previous stage of the amplifying unit 1316, separates a supervisory signal light from the light transmitted from the optical communication apparatus in the previous stage, and outputs the supervisory signal light to the supervisory signal light transmitting/receiving unit 1311. The supervisory signal light transmitting/receiving unit 1311 receives the supervisory signal light output from the branch unit 1322.

The optical communication apparatus 1300B has the same configuration as that of the optical communication apparatus 1300A. With this configuration, the optical communication apparatus 1300A and the optical communication apparatus 1300B constitute a two-way optical communication system. With a further series connection of optical communication apparatuses, such as the optical communication apparatus 1300A and the optical communication apparatus 1300B, a multistage two-way optical communication system can be constituted.

Figure 14:
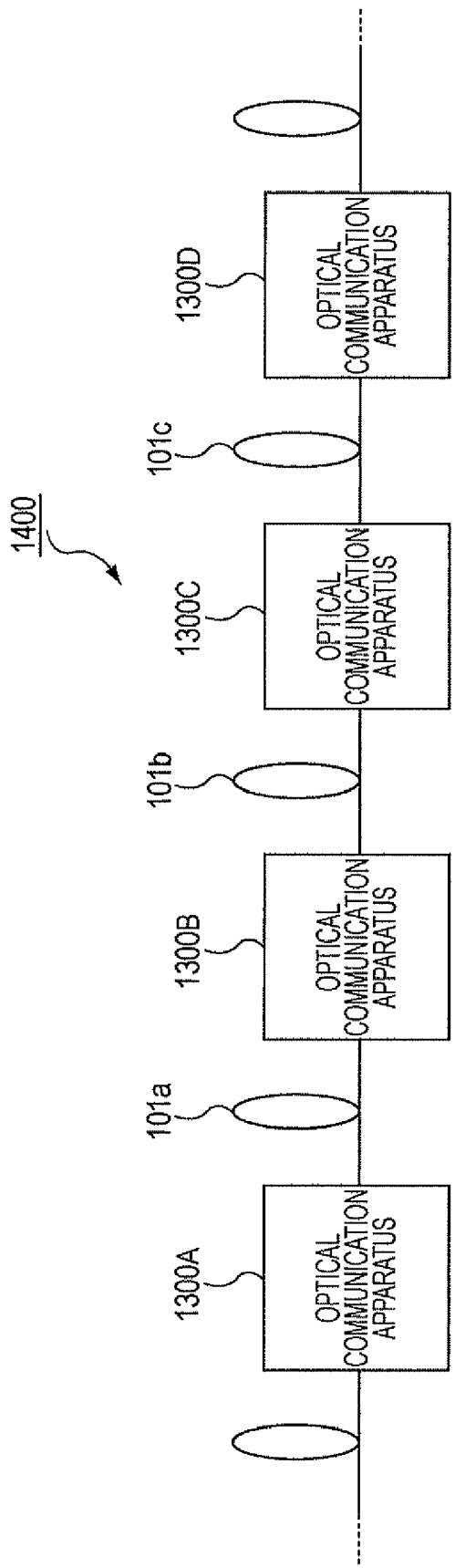
FIG. 14 is a block diagram illustrating a configuration example of an optical communication system to which the optical communication apparatuses illustrated in FIG. 13 are applied.

FIG. 14 is a block diagram illustrating a configuration example of an optical communication system applying the optical communication apparatuses illustrated in FIG. 13. As illustrated in FIG. 14, an optical communication system 1400 includes optical communication apparatuses 1300A to 1300D connected in series through transmission paths 101a to 101c. Each of the optical communication apparatuses 1300A to 1300D has the same configuration as that of the optical communication apparatus 1300A illustrated in FIG. 13.

With this configuration, the power wavelength characteristic of a Raman-amplified signal light can be made uniform in the respective optical communication apparatuses 1300A to 1300D. Accordingly, in the case where a signal light is transmitted from the optical communication apparatus 1300A to the optical communication apparatus 1300D, for example, power variations occurring in output light do not accumulate, so that an improved transmission characteristic can be obtained.

As described above, in the light amplifying device 100 according to the second embodiment, the advantage of the light amplifying device 100 according to the first embodiment can be obtained. Furthermore, the power wavelength characteristic of a Raman-amplified signal light can be made uniform with higher precision by controlling the total power of excitation lights and then finely adjusting the power ratio of the respective excitation lights on the basis of the gains in the main signal lights band $\lambda 2$, the supervisory signal light band $\lambda 1$, and the reference light band $\lambda 3$, while maintaining the total power.

In the second embodiment, a description has been given about the case where gain reference light is contained in a signal light and where the third measuring unit 810 is provided as one of a plurality of measuring units measuring the powers in a plurality of bands included in the amplification band. However, the light amplifying device 100 according to the second embodiment is not limited to this configuration. For example, a signal light may not contain gain reference light, the plurality of measuring units may include only the first and second measuring units 120 and 130, and the power ratio of the respective excitation lights may be finely adjusted on the basis of the gains in the main signal lights band $\lambda 2$ and the supervisory signal light band $\lambda 1$ in the light amplifying device 100.

<Third Embodiment>

Figure 15:
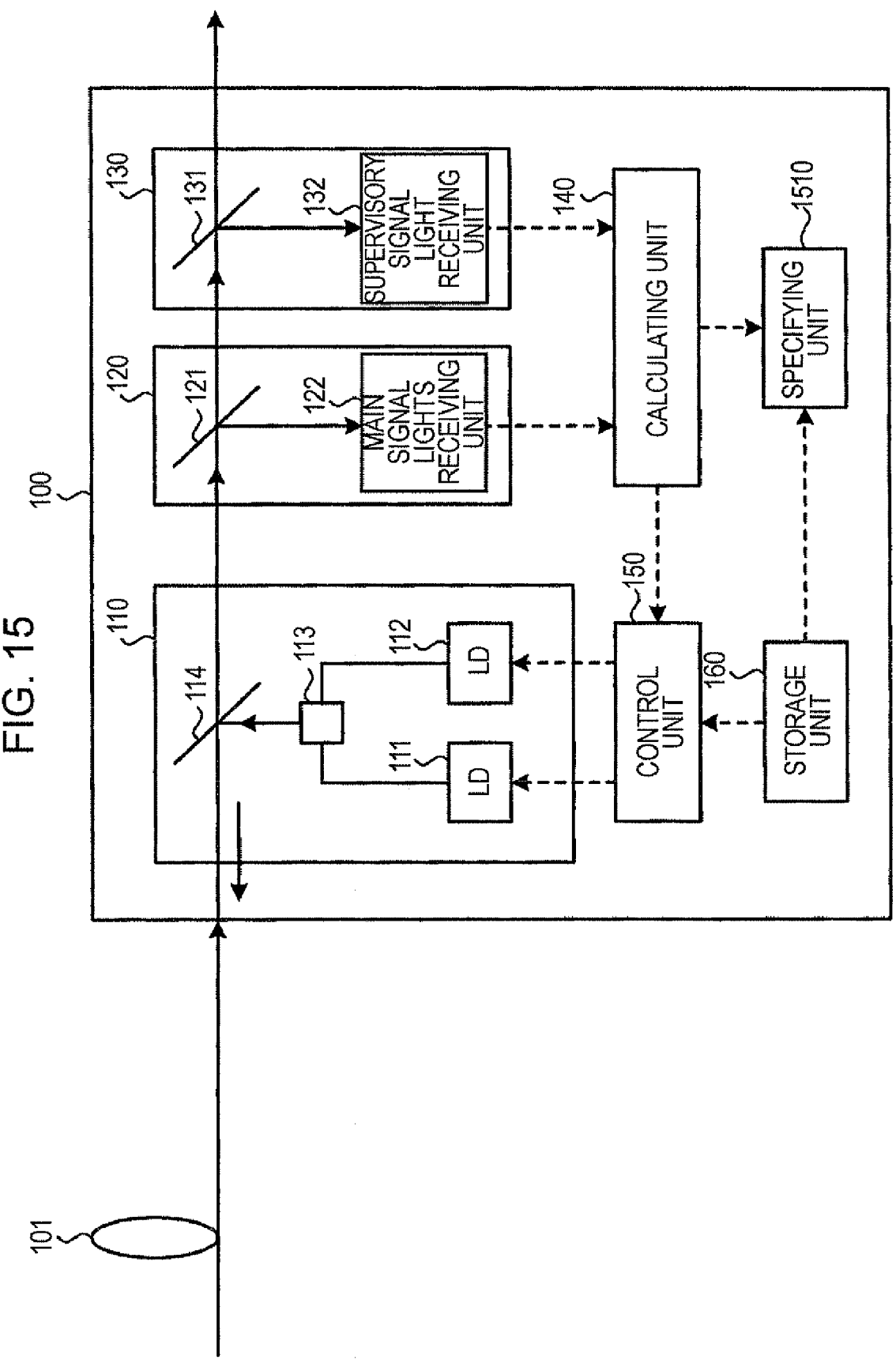
FIG. 15 is a block diagram illustrating a configuration of a light amplifying device according to a third embodiment.

FIG. 15 is a block diagram illustrating a configuration of a light amplifying device according to a third embodiment. In FIG. 15, the elements same as those illustrated in FIG. 1 are denoted by the same reference numerals and the corresponding description is omitted. As illustrated in FIG. 15, the light amplifying device 100 according to the third embodiment includes a specifying unit 1510 in addition to the elements of the light amplifying device 100 illustrated in FIG. 1. Here, the storage unit 160 functions as correspondence information storage units storing correspondence information, indicating the correspondence between ratios calculated by the calculating unit 140 and types of transmission path 101.

The calculating unit 140 outputs ratio information indicating a calculated ratio to the specifying unit 1510. The specifying unit 1510 specifies the type of the transmission path 101 on the basis of the ratio indicated by the ratio information output from the calculating unit 140 and the correspondence information stored in the storage unit 160. The specifying unit 1510 can be realized by a CPU, together with the calculating unit 140 and the control unit 150.

Figure 16:
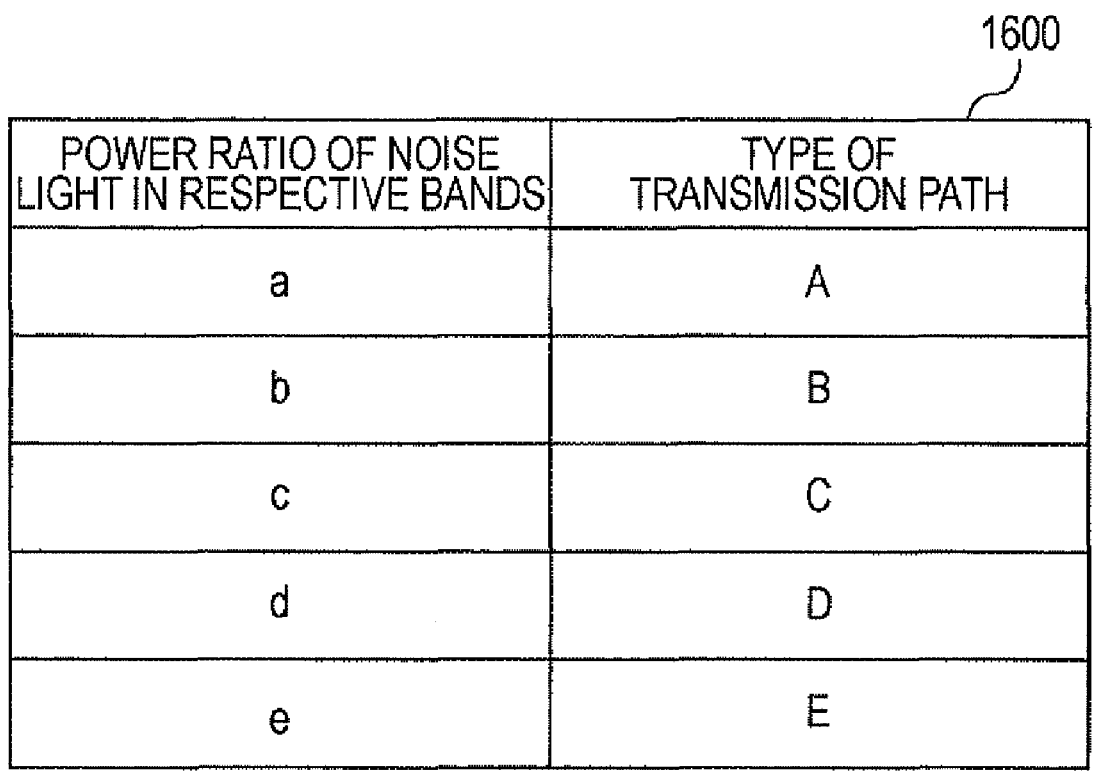
FIG. 16 illustrates correspondence information stored in a storing unit illustrated in FIG. 15.

FIG. 16 illustrates the correspondence information stored in the storage unit 160 illustrated in FIG. 15. In FIG. 16, a table 1600 is the correspondence information stored in the storage unit 160. The ratio calculated by the calculating unit 140 indicates the power ratio of noise light in the main signal lights band $\lambda 2$ and the supervisory signal light band $\lambda 1$. In the table 1600, the power ratios (a to e) of noise light in the respective bands and the types of the transmission path 101 (A to E) are associated with each other.

The power ratio of noise light in the main signal lights band $\lambda 2$ and the supervisory signal light band $\lambda 1$ varies depending on the type of the transmission path 101. Thus, the type of the transmission path 101 can be specified on the basis of the power ratio of noise light in the main signal lights band $\lambda 2$ and the supervisory signal light band $\lambda 1$. Here, the type of the transmission path 101 means the type of an optical fiber (single-mode fiber, dispersion-shifted fiber, etc.) constituting the transmission path 101.

As described above, in the light amplifying device 100 according to the third embodiment, the advantage of the light amplifying device 100 according to the first embodiment can be obtained, and the type of the transmission path 101 can be specified with a simple configuration. According to the correspondence information described above, the power ratios of noise light in the main signal lights band $\lambda 2$ and the supervisory signal light band $\lambda 1$ are associated with the types of the transmission path 101. Alternatively, the gain ratios of the main signal lights and the supervisory signal light may be associated with the types of the transmission path 101. In that case, the specifying unit 1510 specifies the type of the transmission path 101 on the basis of the ratio indicated by the gain ratio information output from the calculating unit 140 and the correspondence information stored in the storage unit 160.

As described above, according to the disclosed light amplifying device and control method, the power wavelength characteristic of a Raman-amplified signal light can be made uniform with a simple configuration. Furthermore, although not illustrated, power variations in output light that complexly varies depending on the condition of a transmission path and the number of multiplexed signal lights may be compensated by controlling the power ratio of respective excitation lights by the control unit 150 while roughly compensating power variations in output light by using an optical filter (GEQ: Gain EQualizer) having a fixed loss wavelength characteristic in the above-described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A light amplifying device comprising:
   a Raman amplifier to Raman-amplify a signal light by inputting excitation lights of a plurality of wavelengths to a transmission path through which the signal light propagates;
   a plurality of receivers that measure powers of light output from the Raman amplifier in a plurality of wavelength bands included in an amplification band of the Raman amplifier; and
   a processor configured to:
   calculate a ratio of the respective powers measured by at least two of the plurality of receivers;
   control the Raman amplifier to input the respective excitation lights to the transmission path before input of the signal light, thereby allowing the Raman amplifier to output noise light; and
   control a power ratio of the respective excitation lights input to the transmission path by the Raman amplifier based on the calculated ratio.

2. The light amplifying device according to claim 1, wherein the signal light includes main signal lights and a supervisory signal light, and
   wherein the plurality of receivers measure the powers in the plurality of wavelength bands including a wavelength band of the main signal lights and a wavelength band of the supervisory signal light.

3. The light amplifying device according to claim 1 or 2, wherein each of the plurality of receivers includes a filter unit transmitting only light in a corresponding wavelength band among the plurality of wavelength bands; and a light receiving unit receiving the light transmitted through the filter unit and outputting an electric signal corresponding to a power of the received light.

4. The light amplifying device according to claim 1 or 2, further comprising:
   a storage unit storing a target ratio value, which is the ratio enabling a power wavelength characteristic of the signal light to be uniform,
   wherein the control unit controls the power ratio of the respective excitation lights so that the ratio calculated by the calculating unit has the target ratio value stored in the storage unit.

5. The light amplifying device according to claim 1, wherein the control unit controls the power ratio of the respective excitation lights and then controls a power of the respective excitation lights while maintaining the power ratio.

6. The light amplifying device according to claim 5, further comprising:
   a gain calculating unit calculating gains in the plurality of wavelength bands based on the respective powers measured by the plurality of receivers during input of the signal light; and
   a gain ratio calculating unit calculating a ratio of the respective gains calculated by the gain calculating unit,
   wherein the control unit controls the power and then controls the power ratio of the respective excitation lights on the basis of the ratio of the respective gains calculated by the gain ratio calculating unit while maintaining the power.

7. The light amplifying device according to claim 6, further comprising:
   a gain ratio storage unit storing a target ratio value, which is a ratio of the respective gains enabling the power wavelength characteristic of the signal light to be uniform,
   wherein the control unit controls the power ratio of the respective excitation lights so that the ratio of the respective gains calculated by the gain ratio calculating unit has the target ratio value stored in the gain ratio storage unit.

8. The light amplifying device according to claim 1, 2, 5, 6, or 7, further comprising:
   a correspondence information storing unit storing correspondence information indicating correspondence between the one or more ratios calculated by the calculating unit and one or more types of transmission paths; and
   a specifying unit specifying a type of transmission path based on a ratio calculated by the calculating unit and the correspondence information stored by the correspondence information storage unit.

9. A method for controlling a Raman amplifier to Raman-amplify a signal light by inputting excitation lights of a plurality of wavelengths to a transmission path through which the signal light propagates, the method comprising:
   measuring powers of light output from the Raman amplifier in a plurality of wavelength bands included in an amplification band of the Raman amplifier;
   calculating a ratio of at least two of the respective measured powers; and
   controlling a power ratio of the respective excitation lights on the basis of the calculated ratio,
   wherein the Raman amplifier is controlled to input the respective excitation lights to the transmission path before input of the signal light, whereby noise light is output from the Raman amplifier, and the power ratio is controlled on the basis of the ratio calculated in the calculating step.

10. The method according to claim 9, further comprising:
    controlling a power of the respective excitation lights while maintaining the power ratio.

11. The method according to claim 10, further comprising:
    calculating gains in the plurality of wavelength bands based on the measured respective powers during input of the signal light;
    calculating a ratio of the calculated respective gains; and
    controlling the power ratio of the respective excitation lights based on the calculated ratio of the respective gains while maintaining the power controlled in the second control step.

* * * * *